Oct. 23, 1951

L. L. BURNS, JR 2,572,313

MAGNETOSTRICTION DEVICE

Filed March 30, 1949

INVENTOR
LESLIE L. BURNS, JR.
BY Morris Rabkin
ATTORNEY

Patented Oct. 23, 1951 2,572,313

UNITED STATES PATENT OFFICE 2,572,313

MAGNETOSTRICTION DEVICE

Leslie L. Burns, Jr., Princeton, N. J., assignor to Radio Corporation of America, a corporation of Delaware Application March 30, 1949, Serial No. 84,374

13 Claims. (Cl. 171—209)

Figures 1, 2, 3, 4, 5, 6, 7, 8, 9, 10, 11:
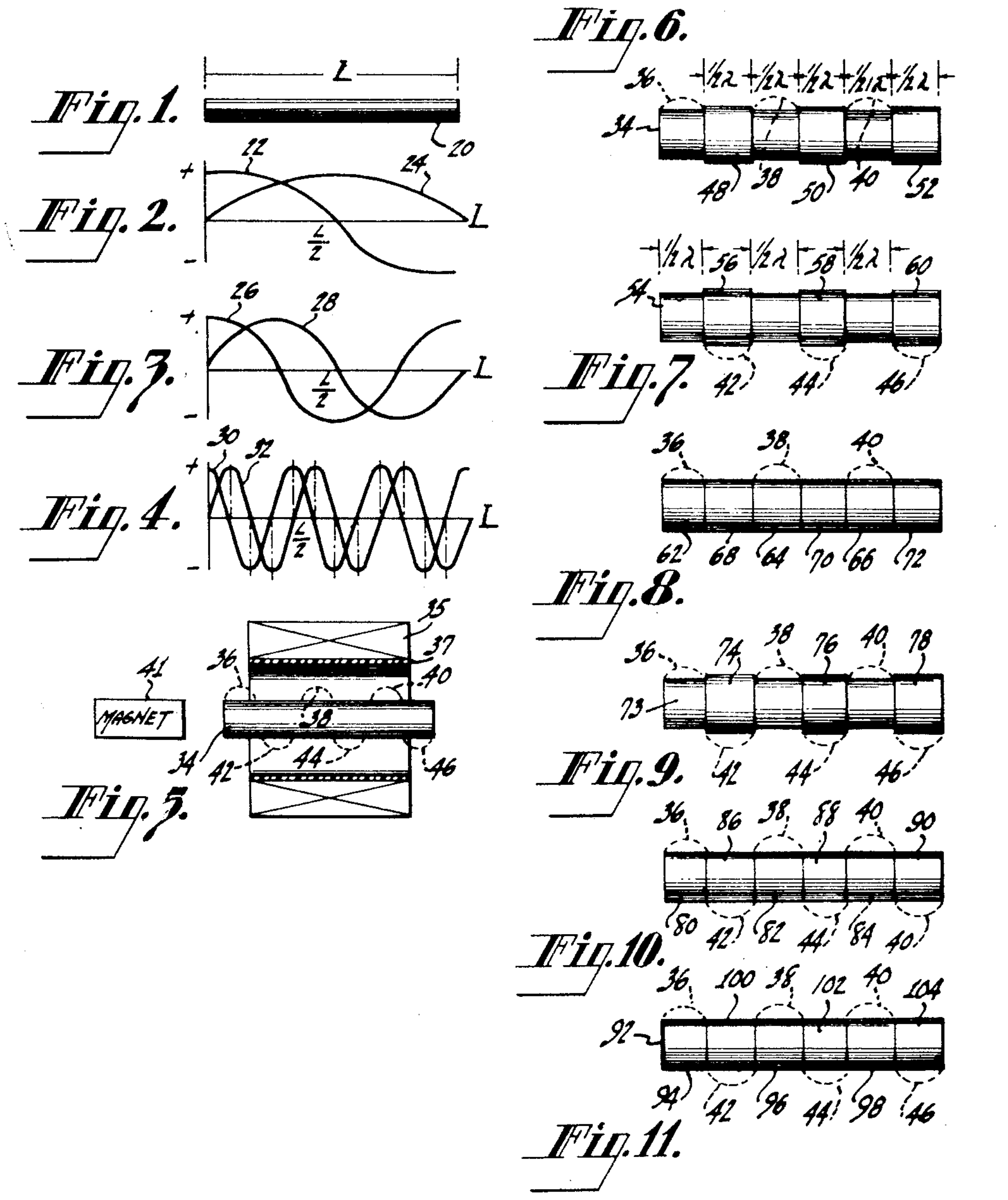

This invention relates to vibrators, and more particularly to an improvement in magnetostrictive vibrators.

Magnetostrictive vibrators have come to have increasingly greater use as electromechanical transducers at sonic and supersonic frequencies. A magnetostrictive transducer usually consists of a coil and a core of magnetostrictive material. The core is usually dimensioned to be mechanically resonant at the frequency of the exciting current in the coil. The fundamental resonant frequency of a given core vibrator is substantially the frequency at which the vibrator is one-half wavelength long, using the velocity of sound in the material of the vibrator for the mode of vibration used in computing the wavelength. It can therefore be seen that as the frequency increases, wavelength decreases, and accordingly the length of the core required for resonance diminishes. At frequencies above 500 kc. the vibrator size is comparatively small and the coupling between the core and the driver coil is seriously reduced with consequent impairment of the efficiency of the magnetostrictive transducer. Reduction in the size of the driver coil in order to improve the operation of the system does not result in any substantial increase in efficiency at the frequencies above 500 kc.

A vibrator can also respond to frequencies higher than its fundamental frequency where its length is an integral number of half wave lengths. However, utilization of a vibrator by excitation at a frequency at which its length is an integral number of half wave lengths also shows a serious reduction in coupling between vibrator and coil, with consequent impairment of the efficiency of the transducer at frequencies higher than about 500 kc. The reasons for this are more fully explained herein.

It is, accordingly, an object of my invention to provide improved magnetostrictive vibrators which are capable of operation at higher frequencies than was possible heretofore.

It is another object of my invention to provide magnetostrictive vibrators which are capable of operation at higher frequencies without reduction in size.

It is still a further object of my invention to provide magnetostrictive vibrators which are capable of operating at higher frequencies than heretofore without decreasing the physical size of the exciting or pick-up coil.

These and other objects are achieved in accordance with my invention by converting existing magnetostrictive vibrators or constructing magnetostrictive vibrators of alternating half wavelength sections of positive and negative magnetostrictive material. Another system for achieving these and other objects in accordance with my invention is to convert existing vibrators or to construct magnetostrictive vibrators of alternating half wavelength sections of magnetostrictive material and non-magnetostrictive material. Still another system of achieving these and other objects in accordance with my invention is to use half wavelength shields spaced half wavelength apart on a magnetostrictive vibrator.

Positive magnetostrictive material is defined as magnetostrictive material which expands in the presence of an increasing magnetic flux. An example is Permalloy. Negative magnetostrictive material is defined as magnetostrictive material which contracts in the presence of an increasing magnetic flux. An example is nickel.

Features of my invention, both as to its organization and method of operation, as well as additional advantages thereof, will best be understood from the following description of several illustrative embodiments thereof when read in connection with the accompanying drawings in which:

Figure 1 shows a plan view of a free mechanical vibrator illustrating certain principles of operation considered necessary to an understanding of my present invention, Figure 2 shows curves of the motion and the pressure along the length of the vibrator when vibrated at its fundamental frequency at a given instant of time, considered necessary to an understanding of my invention, Figure 3 shows curves of the motion and pressure along the length of the vibrator when vibrated at twice its fundamental frequency at a given instant of time, considered necessary to an understanding of my invention, Figure 4 shows curves of the motion and pressure along the length of the vibrator when vibrated at six times its fundamental frequency, considered necessary to an understanding of my invention, Figure 5 shows, partly in cross section, an arrangement of a magnetostrictive vibrator system further illustrating certain principles of operation considered necessary to an understanding of my present invention, Figures 6 through 11 are fragmentary plan views showing various embodiments of my invention as applied to the vibrator.

Referring more particularly to the drawings wherein similar reference characters represent similar parts throughout, there is shown in Fig. 1 a mechanical vibrator 20, in the form of a rod, and having a length L. The wavelength of the fundamental resonant frequency is substantially twice the length of the vibrator or 2L.

Assume that the vibrator is being resonated longitudinally at its fundamental frequency. In Fig. 2 is shown a curve 22 which is a plot of the motion of the vibrator along its length while being thus resonated. Motion to the right is assumed to be positive and motion to the left is assumed to be negative. The curve 22 is plotted at the instant of time when both ends of the vibrator are commencing to move toward its center from the normal position. The curve 22 therefore shows that at the given instant of time the left end of the vibrator is moving to the right and the right end is moving to the left. The center of the vibrator remains motionless, as shown in Fig. 2. In Fig. 2 the curve 24 of mechanical pressures along the length of the vibrator, which are set up by reason of the resonant vibration, is plotted at the same instant as was chosen for the curve 22. The pressure of compression is considered positive, and the pressure of tension is considered negative. Curve 24 in Fig. 2 shows that at the instant chosen, there is a point of maximum compressive pressure at the center of the vibrator. One half cycle later, the ends of the vibrator will move outward from their normal position and the center of the vibrator while still remaining motionless will become a point of maximum tension. The curves 22 and 24 at that time will appear as their reciprocals. The vibrator goes through these cycles of motion and pressure, with the center remaining motionless, when it is vibrated longitudinally at its fundamental frequency.

Resonating the mechanical vibrator longitudinally at a higher harmonic of its fundamental resonating frequency produces an apparent breakup into adjacent half wave sections along the length of the vibrator. If any one of these half wave sections are considered and curves of motion and pressure along its half-wave length are drawn they will resemble the curves 22, 24, respectively shown in Figure 2. However, adjacent ones of these half wave sections are always one half cycle out of phase and the cyclic variations of these half wave sections are of course at the rate of the frequency of vibration. This is illustrated in Figure 3 which shows curves of the mechanical motion and pressure which occur along the length of the vibrator when it is mechanically resonated at its second harmonic. The curve 26 is a plot of the motion along the vibrator at the given instant when both ends are commencing to move to the right from the normal position. The curve 28 is a plot of the pressure along the vibrator at the same instant. The halves of the curves 26, 28 to the left of the midpoint of the vibrator are in phase opposition to the halves of the curves to the right of the midpoint of the vibrator.

This mechanical pressure and motion analysis applies to the vibrator at any harmonic of the fundamental resonant frequency at which it is vibrated. Figure 4 shows, by way of example, the curves 30, 32 which are respectively plots of the motion and pressure which are established at a given instant along the length of the mechanical vibrator, as a result of its being resonated at its sixth harmonic. Motion and pressure in adjacent half wave sections are therein seen to be out of phase with each other, while motion and pressure in alternate half wave sections are therein seen to be in phase with each other.

The mechanical vibrator shown in Figure 1 may be made responsive to a magnetostrictive drive either by making it out of magnetostrictive material or by plating it with magnetostrictive material as described in my application Number 84,373 filed March 30, 1949, for "Magnetostriction Devices." Figure 5 shows a magnetostrictive transducer wherein a magnetostrictive vibrator 34 is substantially concentric with a coil 35 on a coil form 37. The magnet 41 is used to polarize the vibrator. For the purposes of illustration assume that the coil 35 is being electrically excited by a generator (not shown) at a frequency which is the sixth harmonic of the fundamental frequency of the vibrator. The coil, as a result of its excitation, sets up an alternating electromagnetic field which either aids or opposes the steady magnetic field which the magnet 41 sets up in the vibrator. Consider the length of the vibrator 34 as six half wave sections. Since, the resultant magnetic field along the length of the vibrator is simultaneously either increasing or decreasing, all the half wave sections of the vibrator affected thereby simultaneously receive magnetostrictive driving pressures of contraction or expansion. This is not the proper condition for a freely resonating vibrator.

As shown by the curves 30, 32 in Figure 4 the resulting motion and pressure in the adjacent half wave sections of the mechanical vibrator 20, when resonating, are in phase opposition. The magnetostrictive driving pressures along the vibrator 34 at alternate half wave sections therefore oppose the mechanical pressures which are established when the vibrator 34 attempts to resonate at its sixth harmonic. The magnetostrictive vibrator 34 will therefore either not resonate at the sixth harmonic or resonate very inefficiently.

The electrical inverse magnetrostrictive effect to the above may be seen from the following. Mechanical vibration of the magnetostrictive vibrator 34 at its sixth harmonic causes the vibrator to have adjacent out of phase half wave sections. The voltages induced in the coil as a result of these out of phase half wave sections are similarly out of phase and therefore substantially cancel.

Attempts were made to overcome the phenomena above described by reducing the coil size to a half wave and positioning it over a pressure loop or motional node. Adjacent half wave coils were so positioned and excited in phase opposition. But the coil size required at the higher frequencies becomes so small as to be physically impossible to make while still furnishing a large enough electromagnetic field to drive the vibrator. The frequency limit reached by these devices is in the vicinity of 500 kc. No reduction in the size of the driver coil is required when my invention is used.

In Figure 5, the halfwave loops 36, 38, 40, 42, 44, 46 shown along the length of the vibrator represent the desired type of magnetostrictive driving pressures which should be set up along the vibrator for most effective resonance at the sixth harmonic in accordance with the analysis of a mechanical resonator shown above. Alternate pressure loops 36, 38, 40 are in phase with each other and in phase opposition with pressure loops 42, 44 and 46. However as disclosed above, due to the fact that the magnetostrictive pressures produced by the system of Figure 5 are in phase in all the halfwave sections of the vibrator 34, the ideal resonant driving condition is not attained.

In one embodiment of my invention, shown in Figure 6, the magnetostrictive rod has sleeves 48, 50, 52 of conductive metal which, are tight fitting and are placed on the vibrator 34 to substantially cover and magnetically shield from the effects of the alternating electromagnetic field the halfwave sections of the vibrator in which undesired magnetostrictive pressures occur. A halfwave is shown in the drawings as $\frac{1}{2}\lambda$. This results in a vibrator having magnetostrictive pressures 36, 38, 40 at alternate halfwave sections which are all in phase and are therefore additive. The undesired magnetostrictive pressures are substantially suppressed by the substantially halfwave magnetic shields, 48, 50, 52. The magnetostrictive vibrator will therefore have a substantial magnetostrictive drive. Conversely, when driven mechanically, a substantial voltage will be detected by the coil. It is to be understood that, in computing the half-wavelength, the speed of sound through the core is used.

It will be appreciated from the above that, in order to utilize the magnetostrictive vibrator at higher resonant frequencies, no change in coil size or magnetostrictive vibrator size need be made except those in accordance with the normal requirements of good, high frequency practice, such as, reduction in coil size to prevent capacitive shunting of the coil and the corresponding changes to couple a vibrator properly with the high frequency coil. In those magnetostrictive transducers wherein the driver coil encloses only a portion of the length of the vibrator, shielding of alternate halfwave sections along the entire length is not absolutely essential. All that is required for best operation at a given frequency is to place, on the magnetostrictive vibrator along the portion affected by the electromagnetic field of the driver coil, tight fitting, magnetic shielding sleeves whose axial length and whose spacing correspond substantially one half the wavelength of the desired frequency. Copper or any other shielding metal may be used for the sleeves. Copper may also be plated on the magnetostrictive vibrator in place of the sleeves. If the copper plating has the same substantial halfwave, axial length and is similarly spaced substantially halfwave apart as are the shielding sleeves, the net result will be the same.

Figure 7 shows another embodiment of the invention utilizing the principles shown above. A core of any non-magnetostrictive material 54 has very tight fitting sleeves 56, 58, 60 of a magnetostrictive material on it. These sleeves 56, 58, 60 are substantially one half-wavelength long and are spaced one half-wavelength apart, as shown above for Figure 6. The half-wavelength is computed based on the speed of sound through the material of the core. The core may be conductive or non-conductive. The magnetostrictive sleeves 56, 58, 60 may be plated on the non-magnetostrictive core if desired and an equally efficient vibrator will result.

An alternative method of fabrication of a magnetostrictive vibrator is shown in Figure 8 wherein substantially half wave sections, of magnetostrictive material 62, 64, 66 and non-magnetostrictive material 68, 70, 72, are shown joined together axially and alternatively.

Another vibrator which is almost twice as efficient as those previously disclosed herein is shown in Figure 9 wherein the vibrator comprises a magnetostrictive core 73 of one magnetostrictive polarity, for example, positive magnetostriction, and the tight fitting substantially halfwave sleeves 74, 76, 78, disposed substantially half-wavelength apart along the core 73 are of opposite magnetostrictive polarity, or in this example negative magnetostriction. It will be appreciated that, in view of the opposite magnetostrictive polarity materials used, the positive and negative magnetostrictive pressures generated in adjacent half-wave sections are properly phased for most efficient drive as shown by the halfwave pressure loops 36, 38, 40 and 42, 44, 46, and the resultant magnetostrictive effects will be approximately twice as great as heretofore. Instead of halfwave sleeves of magnetostrictive material, halfwave rings of magnetostrictive material of one magnetostrictive polarity may be plated at half wavelength intervals on a magnetostrictive core of opposite polarity. An example of the latter is a core of "45 Permalloy" with halfwave nickel rings plated on the core. When the nickel halfwaves expand, the "45 Permalloy" contracts and vice-versa, thus producing a very efficient magnetostrictive drive. Other examples of materials which can be utilized as above stated are positive magnetostrictive and negative magnetostrictive ferrites.

Another efficient vibrator in accordance with my invention is shown in Figure 10 wherein alternate substantially halfwave sections of one magnetostrictive polarity material 80, 82, 84 and the opposite polarity magnetostrictive material 86, 88, 90 are axially joined together. Still another efficient vibrator in accordance with my invention is shown in Figure 11. A core of non-magnetostrictive material 92 has plated over its surface alternate halfwave sleeves of positive magnetostrictive material 94, 96, 98 and negative magnetostrictive material 100, 102, 104. This has the advantage that the alternating magnetic flux always concentrates on the surface, thereby reducing a more efficient drive. In computing the half-wavelengths, the speed of sound through the core material or preponderant material is utilized.

In accordance with the principles of my invention as set forth above, I have been able to make efficient magnetostrictive vibrators at frequencies as high as 2 megacycles by applying half-wave shield sleeves or by applying opposite magnetostrictive polarity half-wave sleeves, or by plating halfwave rings either of shielding material or of opposite magnetostrictive polarity material over the portion of the vibrator under the coil. The fact that my invention is shown and described in connection with the sixth harmonic of a fundamental frequency should in no sense be taken as a limitation of its application to the sixth harmonic. My invention is applicable at all frequencies and harmonics of frequencies. No other physical changes are necessary to change a vibrator efficient at one frequency to a vibrator efficient at a harmonic frequency than to apply the halfwave sleeves or the halfwave plated rings, computing the half-wavelength at the frequency desired, and utilizing the speed of sound through the vibrator core in the computation.

The treatment of the vibrator as disclosed herein is made over that portion of the vibrator which is in the area affected by the electromagnetic field of the exciting or driver coil, since it is principally that area wherein magnetostrictive pressures which are opposed to the mechanical pressures of resonance occur. However, it may also be extended to other areas of the vibrator.

In a copending joint application Serial No. 84,372, filed March 30, 1949 for "Mechanical Filters" by Leslie L. Burns and Walter van B. Roberts, there is disclosed a method of driving a cylindrical magnetostrictive vibrator in a transverse, torsional mode in which a hemicylindrical section thereof, affected by the driving electromagnetic field, is plated with magnetostrictive material of opposite polarity. In applying the principles of my invention to this transverse mode vibrator, in order to extend the utilizable frequency, instead of plating a hemicylindrical section of the vibrator with opposite polarity magnetostrictive material, each hemicylindrical section is plated with half wavelength long half rings of the material, half-wavelength apart, and the half ring plating is also alternated hemicylindrically. The peripheral area affected will then have alternate half-wavelength long, half rings, of positive and negative magnetostrictive material.

Other forms of vibrators are known in the magnetostrictive art, such as "twisters" or "benders," which operate in other than the longitudinal mode and have the vibratory motion characterized by their names. For utilization of these "twisters" and "benders" at the higher frequencies my invention is equally applicable, namely, by using alternative half-wavelengths of opposite polarity magnetostrictive materials or alternative half-wavelengths of magnetostrictive material and non-magnetostrictive material wherever the properties of magnetostrictive materials are required to achieve the desired mode of motion of a vibrator at higher frequecies.

Depicting the vibrator core herein as a rod is not to be construed as meaning that the invention is restricted to that form only. It is equally applicable where the core is rectangular, hollow, in sheets, in strips or in whatever shape the core is made. My invention is also applicable wherever magnetostrictive and non-magnetostrictive materials are joined to achieve a desired result.

Although some modifications of my invention have been shown, it will be apparent to those skilled in the art that many other variations and embodiments thereof are possible. I therefore desire that the foregoing shall be taken merely as illustrating and not in a limiting sense.

What is claimed is:

1. A magnetostrictive vibrator comprising a member having alternate magnetostrictive pressure sections, each section having a length and spacing equal substantially to a half-wavelength at the operating frequency.

2. A magnetostrictive vibrator for resonance at higher modes comprising a member having adjacent opposite phase magnetostrictive pressure sections, each section having a length equal substantially to a half-wavelength at the operating frequency, the resultant output from the alternate ones of said sections being undiminished by any of the remaining ones of said sections.

3. A magnetostrictive vibrator comprising a member having sections of magnetostrictive material of opposite magnetostrictive polarity, the dimensions of all said sections being on the order of half the wavelength at the frequency of operation.

4. A magnetostrictive vibrator comprising a member having sections of magnetostrictive material and sections of non-magnetostrictive material, the dimensions of all said magnetostrictive sections being on the order of half-wavelength at the frequency of operation.

5. A magnetostrictive vibrator comprising a member having sections of magnetostrictive material and sections of non-magnetostrictive material, the dimensions of all said non-magnetostrictive sections being on the order of half-wavelength.

6. In a magnetostrictive vibrator having sections in which magnetostrictive pressures are established in opposition to mechanical pressures established by vibration of said vibrator, the improvement which comprises a tight-fitting magnetic shield covering each of said sections in which said magnetostrictive opposing pressures occur whereby to substantially eliminate said opposing magnetostrictive pressures.

7. In a magnetostrictive vibrator having sections in which magnetostrictive pressures are established in opposition to mechanical pressures established by vibration of said vibrator, the improvement which comprises a tight-fitting shield covering each of said sections in which said opposing magnetostrictive pressures occur, said shield consisting of a material having a magnetostrictive polarity opposite to that of the material of said vibrator whereby said opposing magnetostrictive pressures are substantially eliminated.

8. A magnetostrictive vibrator comprising an integral core of alternate, aligned sections of magnetostrictive material of opposite magnetostrictive polarity, each of said sections being substantially one half-wavelength in length at the operating frequency.

9. A magnetostrictive vibrator comprising a core of non-magnetostrictive material and alternate abutting tight fitting sleeves of magnetostrictive material of opposite polarity disposed axially along said core, each of said sleeves having a length of substantially one half-wavelength at the operating frequency.

10. A magnetostrictive vibrator comprising a magnetostrictive core of one polarity and magnetostrictive sleeves of another polarity, said sleeves being disposed along and tightly fitting said core and having an axial spacing and length of substantially one half-wavelength at the operating frequency.

11. A magnetostrictive vibrator comprising an integral core of alternate aligned sections of positive magnetostrictive material and non-magnetostrictive material, each of said sections being substantially one half-wavelength in length at the operating frequency.

12. A magnetostrictive vibrator comprising a magnetostrictive core, and tightly fitting non-magnetostrictive sleeves made of magnetic shielding material and disposed axially along said core, said sleeves having an axial spacing and length of substantially one half-wavelength at the operating frequency.

13. A magnetostrictive vibrator comprising a non-magnetostrictive core, and tightly fitting magnetostrictive sleeves disposed axially along said core, said sleeves having an axial spacing and length of substantially one half-wavelength at the operating frequency.

LESLIE L. BURNS, JR.

REFERENCES CITED

The following references are of record in the file of this patent:

UNITED STATES PATENTS

| Number | Name | Date |
|---|---|---|
| 1,882,397 | Pierce | Oct. 11, 1932 |